H. SHEMWELL.
FLEXIBLE FRAME HARROW CULTIVATOR.
APPLICATION FILED MAY 31, 1913. RENEWED MAR. 15, 1917.
1,241,775.
Patented Oct. 2, 1917.
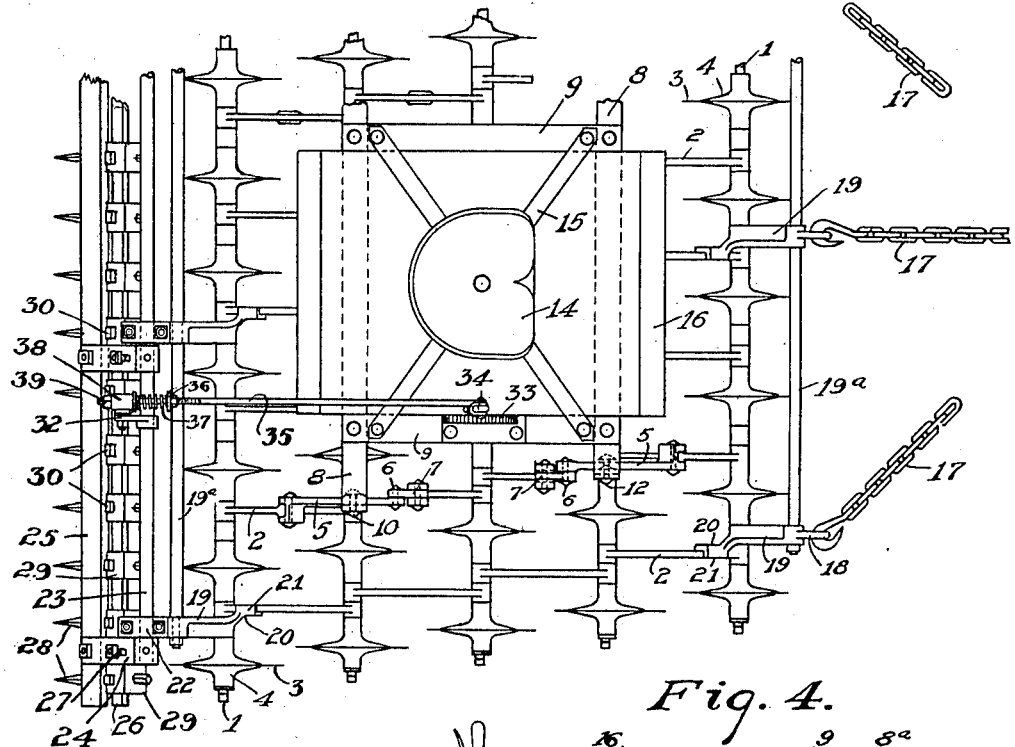
Fig. 1.
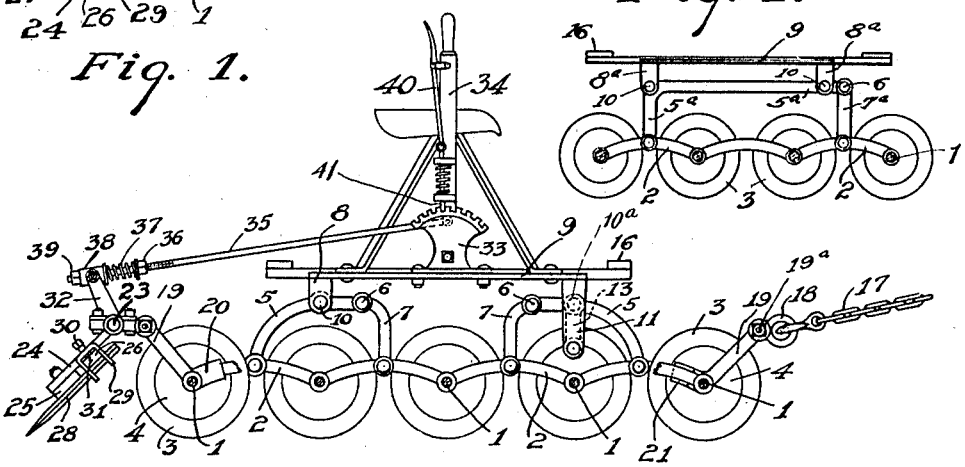
Fig. 2.
Fig. 4.

Witnesses
Wm. C. Crickett
homie Welsh.
Inventor
Harold Shemwell
By Robt S. Johnston Jr.
Attorney

UNITED STATES PATENT OFFICE.

HAROLD SHEMWELL, OF BIRMINGHAM, ALABAMA, ASSIGNOR, BY MESNE ASSIGNMENTS, TO BIRMINGHAM DISC HARROW COMPANY, OF BIRMINGHAM, ALABAMA.

FLEXIBLE-FRAME HARROW-CULTIVATOR.

1,241,775.　　　　Specification of Letters Patent.　　Patented Oct. 2, 1917.

Application filed May 31, 1913, Serial No. 770,990. Renewed March 15, 1917. Serial No. 155,090.

*To all whom it may concern:*

Be it known that I, HAROLD SHEMWELL, a citizen of the United States of America, residing at Birmingham, in the county of Jefferson and State of Alabama, have invented certain new and useful Improvements in Flexible-Frame Harrow-Cultivators, of which the following is a specification.

My invention relates to certain new and useful improvements in attachments to the flexible, disk harrow - cultivators, such as are described and claimed in a pending application filed by Harold Shemwell, Serial No. 681,928.

The objects of my present invention are to simplify and perfect the mechanism for attaching the seat and weight board to the flexible frame upon which the disks are mounted and to provide an improved attachment for scraping and leveling the ground behind the disks in order to make a more perfect bed.

My invention, so far as it relates to the seat support, is designed to avoid any loose or sliding joints and to provide instead interchangeable flexible supports which distribute their weight over the transverse disk shafts and support the seat and weight frame in such manner that it will swing on its supports to accommodate itself to the various adjustments of the harrow frame and at the same time the supports themselves will not interfere with the free flexing of the harrow frame upon which they are mounted, it being essential that no connection should be made which will prevent the flexible frame of the harrow from permitting the disks thereon to closely follow the irregular conformation of the ground.

My invention pertaining to the drag attachment consists in providing a combined tooth and scraper attachment susceptible of adjustment to change it from a plain scraper to a combined scraper and tooth drag, the same being pivotally connected to the rear end of the harrow frame and adjusted by a handle convenient to the driver.

My invention further embodies the novel details of construction and arrangement of parts hereinafter more particularly described and claimed, reference being had to the accompanying drawings, in which:—

Figure 1 is a top plan view partly broken away of the harrow cultivator.

Fig. 2 is a side elevation of Fig. 1.

Fig. 4 is a modification of the flexible supports for the seat frame as adapted to a four shaft harrow.

Similar reference numerals refer to similar parts throughout the drawings.

Figure 3:
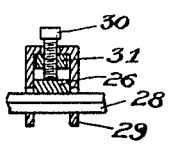
Fig. 3 is a detail view illustrating the manner of mounting the teeth in the drag.

The general construction of the flexible disk harrow does not differ substantially from the disclosure in the Shemwell application above referred to and, briefly described, comprises a series of transversely arranged parallel shafts 1 which are connected by a series of equi-distantly spaced links 2 which are arched as viewed in side elevation and which are arranged in diagonal rows from front to rear to give the shafts an echelon or stepped arrangement. A series of sharpened, annular cutting disks 3 are each mounted in or formed integral with hub portions which are extended to provide ample bearing for the disks on the shafts and to coöperate with the ends of the links 2 in suitably and equi-distantly spacing the several disks so that their lines of travel are distinct, yet closely associated. The ends of the links make a loose joint with the axles 1, the links and axles together forming a flexible frame work which will permit the shafts to rise and fall freely in following the irregularities of the ground and will, to the requisite extent, permit the shafts to tilt angularly in a vertical plane. These various movements of the frame serve to shorten its length and to distort it in such a variety of ways that it has been found difficult to provide a simple and rugged seat and weight support which will accommodate itself to the various adjustments of the frame work and which will preferably distribute the weight uniformly over the whole frame.

According to my present invention I provide hinged supports for the seat and weight frame, each of which supports comprises a member 5 pivoted at its lower end to the top of the arch of a link 2 and having its upper end bent over and at its free end pivotally connected by a bolt 6 to a vertical member 7, the lower end of which is pivoted to the top of the arch of a link 2 in the transverse row next ahead or behind that of the link to which the section 5 is connected. This support, with its pivoted sections 5 and 7 pivotally mounted on the links which connect three adjacent shafts 1, will distribute the weight on it over these shafts. For purposes of economy in construction, these hinged supports are alike and of a standard size, the sections 7 being preferably disposed toward the center of the harrow and the sections 5 being connected to the links which connect the front and rear end pairs of axles. In the preferred construction of frame, I use five shafts, and as seen the several supports are arranged to distribute their weight onto these several shafts.

A seat supporting-frame work is formed of transverse metal bars 8 which are connected by brace bars 9 extending from front to rear of the harrow, these bars being bolted or otherwise rigidly connected to the bars 8 and holding them in rigid spaced relationship. The ends of the bars 8 project beyond the bars 9 and have their ends bent down, the ends of the rear bar 8, being pivotally connected by the bolts 10 to the sections 5 of the rear hinged supports, while the forward bars 8 are provided with elongated downturned end portions 11 which extend well below the hinged supports and at their lower ends are pivotally connected by bolts 12 to swinging links 13, which, at their upper ends, are pivotally connected by bolts to the sections 5 of the front hinged supports. It will be noted that the bolt holes which receive the pivot bolts 10 are correspondingly placed in the sections 5 and preferably disposed over the middle shaft on which the support bears. The seat 14 is mounted on bent metal legs 15 which at their bottom ends are bolted to the bars 9 of the seat supporting frame. Between the bars 9, and held in position thereby on the bars 8, is a weight platform 16 adapted to receive any suitable weights and also to furnish a foot rest for the driver. The draft rigging comprises the draft chains 17 having hooked ends which engage the eyes 18 of arms 19, which arms are pivotally mounted on the forward shaft 1 and comprise each a rearwardly extending portion 20 having a pair of laterally disposed lugs 21 which interlock with the front end of the adjacent link 2, and thereby hold the arms 19 in their proper upright position, which is such under draft strain as to place sufficient down pressure on the front disks to hold them to their work. A cross rod 19ᵃ connects the upper ends of the arms 19 together and braces them.

I have found it desirable for various purposes to provide the harrow at its rear end with a toothed drag and scraper attachment which is controlled from the seat. To this end I provide arms 19 at the rear of the harrow similar to arms 19 on the front, except that instead of eyes 18 they are provided with a split bearing sleeve 22. A rocker shaft 23 is journaled in the bearing 22, the halves of which are suitably connected together about the shaft which has keyed at each end and at one or more points along its middle portion slotted arms 24. The lower ends of arms 24 are connected to a scrape bar 25, which extends across the rear of the harrow for its entire width. A toothed bar 26 also extends lengthwise of the harrow above the scrape bar and under the arms 24 and a plate is adjustably connected to each arm 24 by a bolt 27 which works in a longitudinal slot in the arm. This arrangement permits the tooth bar to be adjusted lengthwise of the arms to regulate the extent to which the teeth 28 will project below the bar 25. Each tooth 28 is inserted through the ends of a clip 29 which is held in position on the tooth bar by means of a set screw 30 which is passed through an opening in the neck of the clip and screwed through a nut 31 which is held between the arms of the clip against rotation. The inner end of the screw presses against the tooth bar and by forcing the nut away therefrom draws the ends of the clip, with which the tooth is held, toward the bar and holds the tooth firmly in position against the bar while permitting it, when the nut is loosened, to be adjusted in the clip and also permitting the clip to be adjusted along the tooth bar. A crank arm 32 is keyed to the rock shaft 23 at a point opposite one of the cross bars 9 of the seat supporting frame. A tooth segment 33 is bolted to this bar 9 and a lever 34 is pivoted to the lower part of the segment and has a throw rod 35 pivoted to it and provided at its outer threaded end with a nut 36 which forms a seat for a spring 37, the outer end of which bears against an eye 38 which is swivelly connected to the crank arm 32. The outer end of the throw rod projects through this eye 38 and is connected to it by a nut 39. The threaded end of the bolt will work freely through the opening in the eye and the crank is thus pressed against the nut 39 by the action of the spring 37, which yields and permits the rock shaft to swing the tooth and drag upwardly when they strike large or fixed obstructions without causing damage to the parts. The lever 34 is held adjusted by the spring-pressed detent of ordinary construction controlled by the grip arm 40 on lever 34. Though for certain purposes I prefer the harrow frame to comprise five shafts, yet the principles embodied in my present invention can be readily adapted for use with a four shaft flexible frame, and such a construction is illustrated sufficiently in Fig. 4 to show the modification of the yielding supports upon which the seat frame rests. As here illustrated the yielding support comprises a rear member 5ᵃ which is similar to 5, except that its upper end is extended forward over the two intermediate shafts and is there connected to a vertical member 7$^a$ which is similar to 7 and is pivotally connected to the links resting on the two forward shafts. The seat and weight frame has its cross bars 8 bent down at their outer ends to form flanges 8$^a$ which are connected by bolts or pins 10 to the member 5$^a$. In this arrangement it will be noted that the rear part of the frame rests on links common to the two rear shafts and the forward part of the shaft rests on links common to the two forward shafts, and in like manner the weight of the frame is distributed uniformly over the several disks just as in the case of the construction shown in Figs. 1 and 2.

In operation, as the several disk shafts 1 rise and fall and tilt in following the inequalities of the ground, the seat supports will swing about their pivotal connections to their links 2 and about the pivot bolts 6 which permit the frames to flex or articulate in a vertical plane to provide for the shortening of centers between the pivotal connections to the links 2. At the same time the rear bar 8 of the seat supporting frame will pivot about the bolts 10 on the rear supporting members 5 and, in the construction shown in Figs. 1 and 2, will swing bodily back and forth on the links 13 which are pivoted to the forward supports, thereby permitting the seat supporting frame to accommodate itself to any ordinary operating conditions without binding or interfering with the free flexing of the harrow frame or the desired distribution of weight over the whole harrow frame. Where the four shaft construction is used as in Fig. 4, the forward end of the frame instead of swinging from a depending links, such as 13, swings with the member 7$^a$ forming part of the support. The swivel eye 38 permits the throw rod to swing in following the movements of the seat supporting frame. The seat frame being connected to the members 5 or 5$^a$ of the rear supports which in turn are connected to links which pivot about the rear shaft that supports the drag attachment, it follows that the segment 33, as the seat frame rises and falls, will move about the rear shaft as a center and the movement of the seat frame will thus not practically interfere with the adjustment of the drag attachments.

I prefer that the flexible supports for the seat and weight frame should take advantage of the presence of the links 2 as a means to mount the supports on the axles, but other and modified arrangements may be used provided they permit the shafts, to which they are connected, to have the requisite relative movements described. When I refer to the seat and weight frame, I mean to include any suitable frame work adapted to support either the driver or the weight, or both. A divisional requirement having been made in reference to the claims directed to the construction and arrangement of the scraper and the means of controlling it, the same have been withdrawn from this application which is restricted to the construction of the harrow and its seat and weight connections.

In compliance with the requirements of law, I have described what I consider the preferred embodiment of my invention and have not attempted to mention the various modifications and changes which one skilled in the art could readily make without departing from the principles underlying my invention.

Without therefore limiting myself to the specific construction shown, what I claim as new and desire to secure by Letters Patent, is:—

1. In a cultivating implement, a flexible frame work comprising a series of parallel transverse tool bearing shafts and links loosely connecting said shafts, and a flexible seat support which is supported wholly by the links and is loosely and accommodatively connected at one end to said links, substantially as described.

2. A flexible disk harrow comprising transverse disk shafts, links loosely connecting said shafts, a seat support pivoted at one end to said links, and swinging supports which connect the other end of said support to said links, substantially as described.

3. A flexible disk harrow comprising transverse disk shafts, links loosely connecting the shafts, and a seat support partly pivoted and partly swung from said links, substantially as described.

4. A flexible disk harrow comprising transverse disk shafts, links loosely connecting said shafts, a seat and weight frame having arched supports which are pivotally connected to links near each end of the harrow, arms pivotally connected to the arched supports near one end of the harrow, and means to swing said frame at one end from said arms and at the other end to pivot it to said supports, substantially as described.

5. A flexible disk harrow comprising transverse disk shafts, links loosely connecting said shafts, a rigid seat and weight frame having hinged arched supports at one end which are pivotally connected to links near the rear end of the harrow and to the frame, and means to swing the forward end of the frame from hinged supports which rest on links connecting three disk shafts near the front end of the harrow, substantially as described.

6. In a flexible disk harrow, a flexible frame work comprising transverse disk shafts, links loosely connecting said shafts, a seat and weight frame, arched hinged supports pivotally connected to the frame and to links which connect three of said shafts, and a supporting means for the forward end of said seat and weight frame comprising flexible frames supported by other three shafts and a swinging member swung from each frame and pivotally connected at its free end to said seat and weight frame, substantially as described.

7. In a disk harrow, a flexible frame work comprising transverse disk shafts and links loosely connecting said shafts, a seat frame mounted on the frame work comprising four similar arched supports, each support comprising sections which are pivotally connected to each other and to links which connect different pairs of shafts, a fixed pivot for connecting one end of the frame to one set of supports, and swinging arms to connect the other end of the frame to its respective sectional supports, substantially as described.

8. In a disk harrow, a flexible frame work comprising transverse disk shafts and rigid links loosely connecting said shafts, hinged supports which are mounted on said rigid links, a seat frame, and means to mount said frame on said supports, which means permit the supports at different ends of the harrow to move relatively and freely, said supports being mounted on links which connect all the disk shafts thereby distributing the seat weight uniformly over the flexible frame work of the harrow.

9. In an implement of the character described, transverse tool bearing shafts and links loosely connecting said shafts, flexible supports pivotally mounted on said links, and a frame work mounted on said supports, said frame work being partly pivoted and partly swung from said supports, substantially as described.

10. In an implement of the character described, the combination with a series of transverse disk shafts which are loosely connected together by links, of a seat and weight frame, flexible supports for said frame which are each pivotally connected to links which connect different shafts, the supports at each side of the implement, being substantially equally supported by all the shafts, and loose connections between the frame and said supports, substantially as described.

11. In a farming implement of the character described, in combination, a series of transverse disk shafts, a plurality of links loosely connecting each adjacent pair of shafts, hinged supports pivotally connected to links in different transverse rows, a seat and weight supporting frame work, means to pivot said frame work to the rear supports, arms suspended from the forward supports, and means to pivotally connect said frame to the free ends of said arms, substantially as described.

12. The combination with a harrow cultivator having a flexible frame work, of hinged supports, means to pivotally connect said supports to the frame work, a seat supporting frame which is rigid in construction, means to pivotally connect said frame at one end to certain of said flexible supports, and means to swing the other end of the frame from other of said supports, substantially as described.

13. A flexible disk harrow comprising transverse disk shafts and links loosely connected to said shafts, arms mounted on the forward shaft and having at their front ends means for the attachment of draft rigging, and having at their rear ends extensions, each of which interlocks with a link connecting the two forward shafts, substantially as described.

14. In a flexible harrow, a series of transverse disk shafts, disks mounted thereon, connecting links between the shafts, which links serve to space the disks, and additional spacing means provided on the front and rear shafts which have only half the number of links connected thereto that the intermediate shafts have, said additional spacing means comprising sleeves, a plurality of which have each a cuff provided with side arms which straddle and interlock with a link, and an upwardly extending arm adapted to connect with the draft rigging, substantially as described.

15. In a harrow having a flexible frame work comprising transverse disk shafts and links loosely connecting said shafts, spacer sleeves on the front shafts comprising each a rearwardly extending cuff open at the side and adapted to interlock with the top and bottom edges of a link, and an upward and forward extending arm adapted to connect with the draft rigging, substantially as described.

16. In a cultivating implement, the combination with a flexible frame work comprising transverse tool bearing shafts and links loosely connecting said shafts, of supports comprising sections which are hinged together and adapted to flex in a vertical plane and which are accommodatively connected to said shafts, and a rigid seat and weight frame resting on said flexible supports, said supports being supported by and adapted to distribute their weight over said several shafts.

17. In a flexible disk harrow, a series of transverse tool bearing shafts, links loosely connecting said shafts, a seat and weight frame, and arched supports on which said frame is pivotally mounted and which at their ends are pivoted to said links, said supports having a joint in them to permit their ends to move relatively in a vertical plane in following the flexing of the harrow.

18. In a flexible disk harrow, loosely connected tool supports, a rigid seat and weight frame, and yielding supporting means for the frame which rest on and distribute their weight over said tool supports, said supporting means comprising articulated arched links which are pivotally connected to the tool supports and which are adapted to flex in a vertical plane.

In testimony whereof I affix my signature in presence of two witnesses.

HAROLD SHEMWELL.

Witnesses:
  GEO. A. NEAL,
  NOMIE WELSH.

Copies of this patent may be obtained for five cents each, by addressing the "Commissioner of Patents, Washington, D. C."